(12) United States Patent
Neill et al.

(10) Patent No.: US 11,044,497 B1
(45) Date of Patent: *Jun. 22, 2021

(54) METHOD OF UNIFIED VIDEO SWITCHING AND ADVERTISEMENT SPLICING WITHIN CONSUMER DEVICES

(71) Applicant: ZODIAC SYSTEMS, LLC, Hicksville, NY (US)

(72) Inventors: Richard Neill, Garrison, NY (US); Leon Rivkin, Muttontown, NY (US); Valerii Grishin, Farmingville, NY (US); Alexei Savguira, North York (CA)

(73) Assignee: ZODIAC SYSTEMS, LLC, Hicksville, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/590,621

(22) Filed: Oct. 2, 2019

Related U.S. Application Data

(62) Division of application No. 15/905,972, filed on Feb. 27, 2018, now Pat. No. 10,523,977.

(Continued)

(51) Int. Cl.
*H04N 21/234* (2011.01)
*H04N 21/433* (2011.01)
(Continued)

(52) U.S. Cl.
CPC . *H04N 21/23424* (2013.01); *H04N 21/23106* (2013.01); *H04N 21/25891* (2013.01);
(Continued)

(58) Field of Classification Search
CPC ......... H04N 21/23424; H04N 21/4331; H04N 21/458; H04N 21/23106; H04N 21/44016; H04N 21/812
See application file for complete search history.

(56) References Cited

U.S. PATENT DOCUMENTS

| | | | |
|---|---|---|---|
| 2003/0028873 A1* | 2/2003 | Lemmons | H04N 7/17318 725/36 |
| 2005/0137958 A1* | 6/2005 | Huber | H04N 21/812 705/37 |

(Continued)

OTHER PUBLICATIONS

Office Action dated Feb. 6, 2019 for U.S. Appl. No. 15/905,972, filed Feb. 27, 2018.

(Continued)

*Primary Examiner* — Pinkal R Chokshi

(74) *Attorney, Agent, or Firm* — Lawrence G. Fridman, Esq.; Feigin & Fridman, LLC

(57) ABSTRACT

A unified system is provided for splicing of or switching to advertisement videos arriving from sources or video origins into targeted ad spots available in a content video watched by a consumer. The system comprises a plurality of interconnected elements including a unified splicing engine, a markup processor with markup plugins and markup configuration, an ad decision engine, a media player, a data collection client, a plurality of video caches residing at a consumer device and ad services subsystem. The system (Continued)

delivers multiple assets and intelligently splice and switch between the assets to produce a single uninterrupted playout of a content video watched by the consumer on the consumer device.

10 Claims, 4 Drawing Sheets

Related U.S. Application Data

(60) Provisional application No. 62/464,932, filed on Feb. 28, 2017.

(51) Int. Cl.
*H04N 21/458* (2011.01)
*H04N 21/81* (2011.01)
*H04N 21/258* (2011.01)
*H04N 21/231* (2011.01)
*H04N 21/83* (2011.01)
*H04N 21/44* (2011.01)

(52) U.S. Cl.
CPC ... *H04N 21/4331* (2013.01); *H04N 21/44016* (2013.01); *H04N 21/458* (2013.01); *H04N 21/812* (2013.01); *H04N 21/83* (2013.01)

(56) References Cited

U.S. PATENT DOCUMENTS

| | | | |
|---|---|---|---|
| 2010/0223392 A1* | 9/2010 | Pond | H04N 21/4622 709/231 |
| 2010/0251289 A1* | 9/2010 | Agarwal | H04N 21/252 725/34 |
| 2011/0107379 A1* | 5/2011 | Lajoie | H04L 65/1016 725/87 |
| 2013/0007799 A1* | 1/2013 | Sandoval | H04N 21/25883 725/32 |
| 2013/0097634 A1* | 4/2013 | Jin | H04N 21/25841 725/34 |
| 2015/0135214 A1* | 5/2015 | Reisman | H04N 21/4113 725/37 |
| 2016/0156945 A1* | 6/2016 | Romrell | H04N 21/23424 725/36 |
| 2017/0118533 A1* | 4/2017 | Holtz | G06Q 30/0269 |
| 2018/0131975 A1* | 5/2018 | Badawiyeh | H04N 21/222 |

OTHER PUBLICATIONS

Information Disclosure Statement filed in parent U.S. Appl. No. 15/905,972, filed Apr. 23, 2019.

List of References for patent U.S. Appl. No. 15/905,972, filed Aug. 8, 2019.

* cited by examiner

METHOD OF UNIFIED VIDEO SWITCHING AND ADVERTISEMENT SPLICING WITHIN CONSUMER DEVICES

REFERENCE TO RELATED APPLICATION

This Application is a Divisional Application of currently pending application Ser. No. 15/905,972 filed Feb. 27, 2018, which claims priority of U.S. Provisional Application Ser. No. 62/464,932 filed Feb. 28, 2017, the entire disclosure of both Applications is hereby incorporated by reference.

BACKGROUND OF THE INVENTION

An essential aspect of the invention is the ability to splice different videos together, from one or more different source types, delivery methods, and formats, into one seamless playout video on a consumer device or network of multiple consumer devices. Currently there are known types of ad insertion systems that only insert one source video into another. There are no real disclosures provided on how such insertion occurs beyond the limited case of a single video source or delivery method. On the other hand, the present invention provides the ability to seamlessly splice one or more video sources or origins, which originate from multiple delivery methods into a single playout stream for display. This approach is accomplished in such a way that it is intelligently delivered and spliced and/or switched such that a given consumer is unaware multiple video sources are spliced and/or switched among one another according to methods provided by the invention, under the control of a service provider and/or an ad management system. Furthermore, in the invention delivery and access of those origins (or source videos) can be retrieved in such a way to maximize the number of targeted videos available for ad insertion, minimize the network traffic or the burden on the system and consumer device.

SUMMARY OF THE INVENTION

An essential aspect of the invention provides the ability to splice one or more video streams together into a single seamless playout video in such a way that it is efficient for the entire system. There are three essential components of the system of the invention. The first component is the software that runs on a consumer device, such as a set top box, for example. The second is a set of server-side components also referred to in the application as Ad Services System. The third component of the invention disclosed in the application is Ad Management System, which is a system that actually curates and generates available videos and improvises the ability to manage the ad assets in the fonn of campaign management. The Ad Management system might also include the brokering functionality taking place behind the scenes in terms of how advertisers compete for highest financial compensation relative to one another and the available inventory of ad distribution or placement opportunities as one example.

The invention utilizes the notion of origins, which are different ways for a video to be delivered to the consumer device. The origins include, but not limited to, the internet, IP network, broadcast network, a hard drive on a set top box, or any place that can produce a media asset. In the invention, the origins include the entire spectrum of sources on how the video can be transported and delivered to the consumer devices.

Another aspect of the invention provides a splicing engine, which listens for triggers originated at one or more of the origins (live video) that are enhanced by the invention. Accordingly, the system communicates with the ad services system, and the ad service system creates an enriched version of the trigger, that is referred to as a mark-up trigger. The set-top box also obtains that markup trigger through one or more of the origins, and then based on that information, a request is generated to the ad services system which then processes the request and communicates with the ad management system generating the appropriate response to the ad services system, which in turn communicates with the set-top box for further processing by the unified splicing and switching system of the present invention. The response is utilized by the splicing engine to determine how the different origins should be mixed or spliced together to in order to create the resultant playout video which the media player displays.

A further aspect of the invention provides an ad management system with information that is used for ad targeting. The invention also includes the notion of caching of videos on the client and ad services system side. The caching on the ad services system is used to intelligently deliver the ad to an appropriate location, so that a local hard drive, like a DVR box, for example, will schedule the delivery of these ads to be stored on that hard drive for later splicing. In the case of delivery of the ads through the IP network (as an example of one of the origins); it manages the delivery of the advertisements in the most efficient way required by the network. Client-side caching is utilized to facilitate seamless splicing of multiple video content stream components, or chunks into a single video playout. It also supports the ability to maintain multiple ad videos at the consumer device to enable targeting of advertisements based on one or more targeting criteria's.

The ad services system defines many different ways by which the ads are delivered to the consumer device. Furthermore, the ad management system in conjunction with the ad services system facilitates selection of which ads are being placed, as well as where and when such placement has taken place. The ability to splice multiple origins into a single seamless playout video, and to target different types of devices all in the same unified way efficient for the entire system is one of the proprietary features of the invention.

The notions of plugins utilized in the application implies that the invention represents a dynamic system, meaning that as new plugins are developed the system can accommodate substantial flexibility. The notion of the markup plugins is used to describe the nature of the markup process that is utilized to enrich the triggering events.

This depends upon what criteria will be applicable when multiple different markup plugins are used. In the invention, the process is enhanced with additional information and the enrichment process results from the ad services system. The purpose of the enrichment is to allow the engine, the mark up processor and splicing engine to be more intelligent about processing different source videos and reacting to the targeting information that is present within that additional enriched markup. This is the functionality of the markup processor.

Another essential aspect of the invention is utilization of the splicing engine to splice multiple video content sources (that are different from one another) into a unified single playout produced. This occurs in such a way that is intelligently constructed by the enriched triggering data that is provided into the system in conjunction with the back-end components. The control system is where the splicing engine is splicing the origin sources using triggers that are enriched by the ad services system and using those triggers enabling to construct the origins into one seamless playout.

One of the essential objects of the system of the invention is to dynamically consume multiple video sources and to seamlessly splice these different sources into one playout which is accomplished by a media player. Furthermore, the system of the invention also enables the targeting of the ad sources at individual or group levels and also improves upon minimizing the network burden and overhead. The latter occurs by means of caching some of the sources at the client.

Various components illustrated in the diagrams of FIGS. 1, 2, 2A and 2B operate together to allow a user to deliver targeted advertisements in multiple ways and to be consumed by a variety of consumer devices, i.e. set top box, a phone etc. In this manner, the user receives the seamless playout in a highly-targeted way. It is combination of ad services system, markup processor and the unified splicing engine acting on distribution from the one or more origins that comprise the core of the invention.

The system disclosed in the present invention provides a unified method of splicing advertisement videos (ad videos or content assets) from one or more real-time sources or video origins, in the targeted ad spots available in the content video watched by a consumer. Specifically, the functions of the system include:

- Providing seamless real-time video splicing of one or more video content streams into a single video playout stream from one or more video origins;
- Processing and enriching ad spot metadata to enhance ad delivery or targeting;
- Communicating with one or more Ad Management Systems;
- Support consumer profile management by an Ad Management System;
- Support targeting of ad videos by multiple criteria including individual consumers or by arbitrary consumer groups which may contain one or more consumers;
- Support management of the targeting of consumer groups by an Ad Management System;
- Caching of ad videos on the server side;
- Caching of ad videos on the client side; and
- Support for multi and one-to-one targeted ad insertion to a large number of consumer devices by means of multiple targeting criteria.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1:
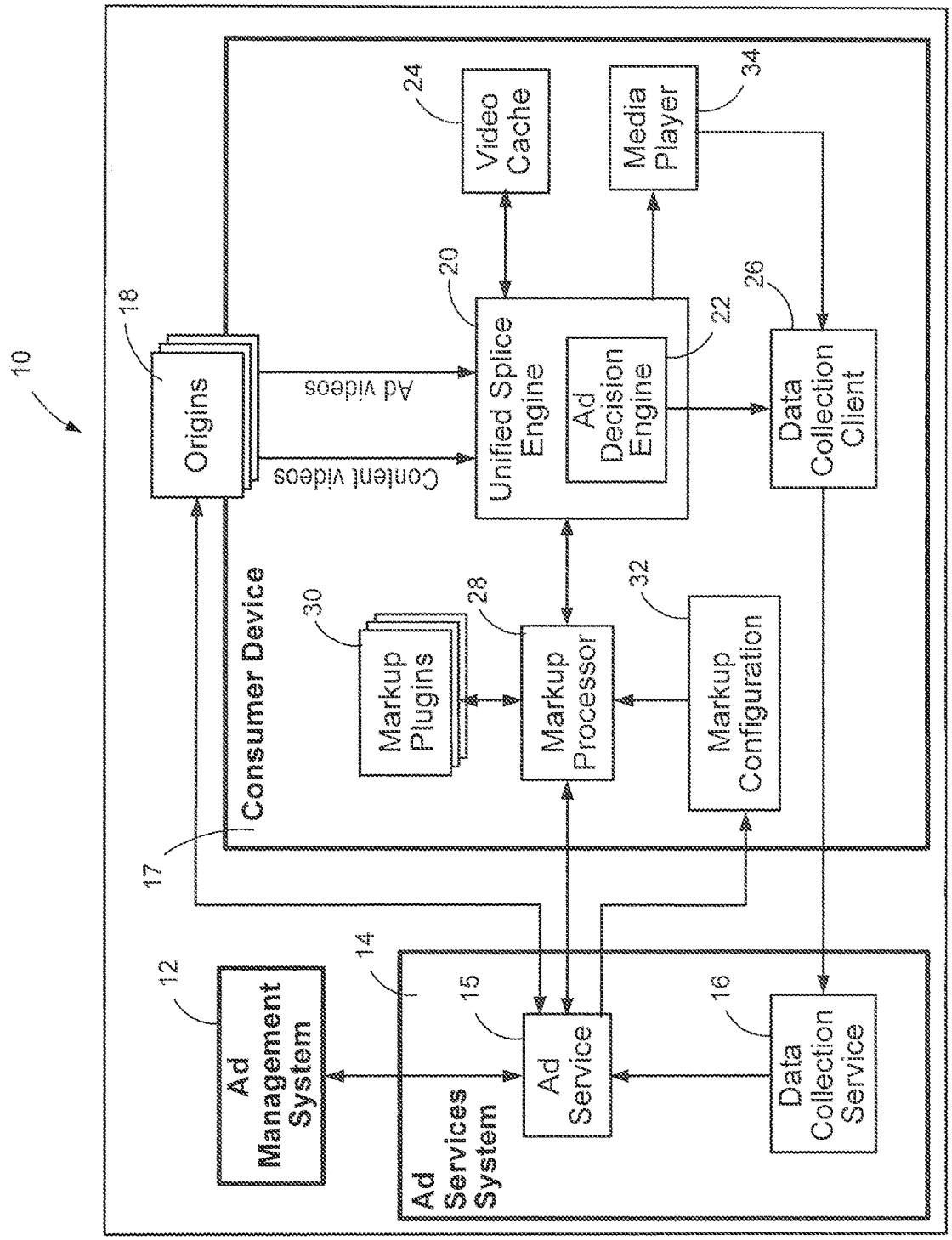
FIG. 1 is a diagram illustrating the system architecture and method of the invention.

Reference is now made to FIG. 1, which is a block diagram view of a splicing system 10 constructed and operative in accordance with embodiments of the present invention.

Definitions

This section provides definitions of terms used to describe the invention. The terms are provided to facilitate understanding of the invention may not necessarily match definitions of the same or similar terms elsewhere.

The term Video (a content video) is used throughout the present specification and claims, in all of its grammatical forms, to refer to any type of a movie, program, sporting event, stream, etc. that constitutes the video that is specifically selected by the consumer.

The term Ad (an advertisement video) is used throughout the present specification and claims, in all of its grammatical forms, to refer to any type of a video that promotes a product or service to a consumer and that is shown to the consumer in addition to the content video. An ad video is herein specifically differentiated from a content video in that it is an advertisement system, not by a consumer, who selects a watch time for it.

The term System refers to a subject of the present invention.

The term Consumer Device is used throughout the present specification and claims, in all of its grammatical forms, to refer to any type of a device used or accessible to a consumer to watch content video.

The term Origin (Video Origin) is used throughout the present specification and claims, in all of its grammatical forms, to refer to any type of a system or subsystem that is designed to provide a data stream containing encoded video, associated encoded audio, and/or arbitrary data.

The term Delivery Technologies is used throughout the present specification and claims, in all of its grammatical forms, to refer to any type of a method of transferring a video from an origin to or within a consumer device. Currently supported delivery technologies are listed below. All delivery technologies are provided to the system via dynamic delivery plugins that can be modified at any time. Each delivery plugin carries one or multiple delivery technologies depending on optimal architecture of a solution built using present invention. Non-listed delivery technology can be enabled by providing a new delivery plugin or by modifying an existing plugin depending on architectural decisions made by an author of a delivery plugin. Supported delivery technologies are as follows:

QAM—Quadruple Amplitude Modulation.
SDV—Switched Digital Video.
IP—Internet Protocol network.
DOCSIS Data Over Cable Service Interface Specification.
Broadcast—delivery to the entire population of consumer devices.
Multicast—delivery to a subset of the entire consumer device population.
Unicast—individual delivery to a single consumer device.
Ethernet—Ethernet interface.
Wi-Fi—Wi-Fi interface.
MoCA—Multimedia over Coax Alliance interface.
RAM (Memory, Buffer or cache)—content delivery from device memory, buffer, or caching space.

The term Ad Spot is used throughout the present specification and claims, in all of its grammatical forms, to refer to a timeframe within content video that is designated for displaying ad videos or streams. For the purpose of the description of the present invention, the following types of ad spots are defined:

The term Live Ad Spot is used throughout the present specification and claims, in all of its grammatical forms, to refer to an ad spot whose metadata is attached to a live broadcast and which arrives to consumer devices responsible for displaying a video only few seconds before an ad spot starts.

The term Recorded Ad Spot is used throughout the present specification and claims, in all of its grammatical forms, to refer to an ad spot whose metadata is stored in the system along with a recorded video the ad spot is associated with. If a live video is recorded and if its associated live ad spot is recorded too, then said associated live ad spot becomes a recorded ad spot.

The term Generated Ad Spot is used throughout the present specification and claims, in all of its grammatical forms, to refer to an ad spot whose metadata did not come to the system with an original video stream but is artificially generated by the system. A generated spot is first produced for a video when video is first displayed to the consumer. If a video is recorded by a consumer and its associated generated ad spot is recorded too, then said generated ad spot becomes a recorded ad spot.

The term Ad Spot Attributes is used throughout the present specification and claims, in all of its grammatical forms, to refer to a set of attributes that characterize an ad spot. For the purpose of the present invention the term "Ad Spot Attributes" is used interchangeably with "Ad Spot Metadata". The primary attributes of ad spot are start time, duration, origin, and other attributes available in the ad trigger signaling the ad spot. The start time attribute tells at which moment of time an ad spot starts related to a content video timeline. Duration tells how long a time frame allocated for the said ad spot is. The origin attribute refers to an origin that ad spot is associated with. The extended attributes are provided by ad spot plugins on a consumer device and by the Ad Services system on the server side.

The term Ad Trigger is used throughout the present specification and claims, in all of its grammatical forms, to refer to a designated markup associated with a video and that carries ad spot's primary attributes and event timing.

The term Ad Impression is used throughout the present specification and claims, in all of its grammatical forms, to refer to a complete or incomplete playback of the individual ad video.

The term Video Sequence is used throughout the present specification and claims, in all of its grammatical forms, to refer to a timed sequence of content video fragments and inserted ad videos rendered or displayed by consumer devices and consequently watched by a consumer.

The term Plugin is used throughout the present specification and claims, in all of its grammatical forms, to refer to a software component that carries specific type of functionality and connects to a system using an interface exposed by a system. A said interface is specifically designed to provide said specific type of functionality to a system. From the perspective of a system all plugins that provide the same specific type of functionality are operating identically.

System Architecture and Components

Diagrams of FIGS. 1, 2, 2A and 2B illustrate the system architecture and operation of the present invention. The system 10 of unified video switching and advertisement splicing within consumer devices 17 typically includes a plurality of operationally connected elements including ad management system 12, ad services system 14, data collection service 16, origins 18, unified splice engine 20, ad decision engine 22, video cache 24, data collection client 26, markup processor 28, markup plugins 30, markup configuration 32 and media player 34.

Ad Management System 12 is an external system responsible for advertisement campaign management, reporting, targeting and ad video selection to be displayed to a consumer.

Ad Services System 14 is a set of components and adapter modules, including ad service 15 and data collection service 16, providing advanced advertising services for a provider network of consumer devices. It is based on the AMS (Advanced Messaging Solution), a messaging and integration hub that hosts multiple components including components of the present invention. The AMS is a product of DevelopOnBox LLC d.b.a. Zodiac Interactive and is used in the diagram as an example host for server-side components.

The Ad Services System 14 supports multiple functions of the invention responsible for the following tasks:
  Provisioning of the Markup Configuration to one or more Consumer Devices.
  Adding server-side generated extended attributes to an ad spot metadata.
  Processing and delivering ad placement requests from a Consumer Device to an Ad Management System.
  Filtering out non-applicable ad videos and origins from the response of an Ad Management System.
  Processing and delivering responses from Ad Management System back to a Consumer Device.
  Retrieving and processing impression statistics from Data Collection Service.
  Reporting and processing impression statistics to Ad Management System.
  Retrieving targeting criteria from Ad Management System.
  Server-side pre-caching of ad videos for targeted consumer devices or groups.
  Managing and controlling Consumer Device's ad video pre-caching behavior.
  Seamless support of multiple Ad Management Systems simultaneously.
  Integration to back-end Ad Management systems is through one or more plugins.
  Plugins of the Ad Services System:
  VAST
  SCTE-130
  Other methods of connecting to an Ad Management System can be enabled by implementing corresponding plugins.

Multi-Service Data Collection Service 16 is responsible for receiving data collection reports from consumer devices 17 according to selection criteria or configuration rules. The Data Collection is used as a service supporting function of the present invention.

Origins 18 are a set of all supported source of content videos and/or ad videos and required further processing through one or more *origin plugins*. The block representing Origins on the diagrams of FIGS. 1, 2, 2A and 2B are illustrated positioned partially overlapping a Consumer Device to emphasize that Origin can be either in a Consumer Device or external to it, except for the corresponding origin plugin which is a dynamic component of the present invention. The present invention is agnostic to the physical placement of an Origin.

The Origins 18 are available to the system via one or more corresponding origin plugins, whereby processing functions contained within origin plugins are executed appropriate to the associated Origin to normalize the corresponding Origin content videos and/or ad videos into a consistent format for further processing. For example, ad video assets delivered by hard-drive based DVR require different processing compared to ad video assets deliver over an IP based network. A list of major supported Origins is provided below. Non-listed Origins can be enabled by providing respective appropriate new dynamic origin plugin.

Supported origins are as follows:
- Linear, also known as Live TV—an origin that broadcasts videos to all interested consumers simultaneously at a time scheduled by a video network.
- Video On Demand (VOD)—an origin that keeps a stock of recorded videos on the VOD servers and which allows a video to be watched at a time selected by consumer.
- Digital Video Recorder (DVR), also known as Personal Video Recorder (PVR)—an origin that stores on a local hard drive previously recorded videos and that allows a video to be watched at a time selected by consumer.
- Local storage is a storage device such as HDD, SSD, etc. closely associated with and controlled by a consumer device or by Ad Services System.
- Network DVR (NDVR)—an origin that keeps previously recorded videos in the server or Cloud network and which allows a video to be watched at a time selected by consumer.
- USB—a video that is available for displayed on a consumer device from another device that is connected to the said consumer devices via USB interface.
- Catch-Up TV—an origin that keeps recently recorded linear video streams and allows a recorded video to be watched at a time selected by consumer.
- RAM or Cache—a random access memory of a consumer device that may store video or portions or elements of video.
- Flash—a flash memory of a consumer device.
- CDN—a content delivery network that manages the efficient storage and distribution, responsible for video delivery, potentially in chunks to a consumer device over IP networks.
- Web Service—any server or other device that can be connected with a consumer device via IP network.
- Cloud Service—any Cloud based infrastructure that can produce video streams via an IP network.

Unified Splice Engine 20 is a core component of the present invention responsible for the Consumer Device side orchestration of all activities related to the processing of seamless splicing of one or more video origins, under the control of Ad Decision Engine 22 and Markup processor 28, into a single video playout at designated time events. The unified splicing engine 20 utilizes a video cache 24 to optimize multi-origin video splice events and ensures proper temporal ordering of all video playout in conjunction with the Media player unit 34.

Ad Decision Engine 22 is an internal component of the Unified Splice Engine 20 responsible for selecting an exact ad video to be played at each specific ad spot.

Video Cache 24 is used by the Unified Splicing Engine 20 and Media Player 34 to achieve seamless multiplexing and temporal ordering of multiple content videos and ad videos into a single video playout. The Unified Splicing Engine 20 may provide (through DMA operations) origins with direct memory access to the Video Cache 24 for direct delivery of the video chunks while the Unified Splicing Engine 20 continues its orchestration (under control logic from the Ad Decision Engine 22 and markup meta-data) of splicing origin video components available from the video cache into a unified video playout stream for the Media player unit 34. The video cache 24 also maintains multiple ad video assets in support of multiple targeting criteria. That is the video cache 24 contains a multiplicity of ad videos in which the targeting or decision engine will select the most appropriate ad video for splicing/switching within the unified splicing engine 20 for video playout.

Multi-Service Data Collection Client 26 is a client-side component of the data collection subsystem. It is responsible for receiving all relevant events from all client-side components participating in a data collection process, pre-aggregating said events according to its own configuration, and delivering resulting collected data to the Data Collection Service 16.

Markup Processor 28 is a client-side component designated to manage and process ad spot metadata and request ad videos from an Ad Services System 14. Functional responsibilities of the Markup Processor 28 are as follows:
- Monitor ad triggers associated with a content video which a consumer device is about to play or is playing.
- Collect and process enhanced ad spot attributes and primary ad spot attributes.
- Collectively the primary ad spot attributes and enhanced ad spot attributes form an enriched ad spot metadata.
- Support plugin based ad spot metadata enrichment.
- Rely ad placement requests from Ad Decision Engine to an Ad Services System. The requests are enriched with ad spot metadata.
- Receive replies from an Ad Services System and rely said replies to the Ad Decision Engine.

As to Plugins of the Markup Processor 30, consumer devices are provided with unique ID plugin. Depending on the consumer device this can be MAC address, IP address, serial number, UUID, and other values uniquely and permanently identifying a consumer device. The ID provided by this plugin can be an atomic value such set forth in the prior sentence or be a composite value consisting of multiple atomic values.

Consumer device hardware characteristics plugin. This plugin provides hardware characteristics that can help an Ad Management System 12 to better select ad videos for a consumer or the targeted group said consumer belongs to. Such hardware characteristics may include screen resolutions, available memory, CPU speed, size of the local storage on a consumer device, etc.

EPG programming metadata plugin. This plugin enriches the ad spot metadata with information about specific program being watched that given ad spot is associated with. The example of EPG programming metadata may include program title, program description, channel name, network name, program parental rating, program viewer rating, etc. The specific set of EPG programming metadata attributes is defined by the data available on a consumer device and as configured for this plugin.

ADM metadata plugin. This plugin enriches the ad spot with metadata retrieved from the third-party Ad Management System 12. The metadata format is an enumeration of one or more self-describing structures. In the event there are multiple ADM systems, a plugin will exist for each third-party ADM system. Other methods of ad metadata enrichment can be supported by adding more plugins to the Markup Processor.

Markup Configuration 32 consists of a list of allowed origins, rules for producing generated ad spots and states of plugins. If the list of allowed origins is empty, then all Origins 18 that a Consumer Device 17 is capable of supporting are allowed and must be engaged. Otherwise, if this list is not empty, then only specified Origins 18 are allowed and must be engaged. Rules for producing generated ad spots are as provided by the Ad Service 15. Supported states of plugins include active, disabled, remove, update, and download (applicable to a newly available plugins).

Media Player 34 is a component responsible for the seamless playout of all content videos and ad videos in the order specified by the Ad Decision Engine 22.

Plugins of the Media Player for video playback include the following:
QAM video delivery;
Switched Digital Video (SDV) based QAM video delivery;
UDP-based video delivery;
Local Memory or Buffer;
HTTP Live Streaming (HLS);
MPEG-DASH;
Real-time Transport Protocol (RTP);
Real-time Streaming Protocol (RTSP);
Non-listed or additional video playback protocols can be supported by adding corresponding plugin to the Media Player.

Description of the System and Method

As to the primary operations, the system and method of the invention are able to dynamically consume multiple video origin sources and seamlessly splice video origins into a single video playout for processing by a media player, as well as to provide individual video and targeted group ad impressions. Assigning consumer devices and pre-caching ad videos for the targeted groups are also provided. Upcoming ad spots are monitored and processed depending on a content video selected by a consumer. Essential functions of the invention also include enhance trigger with additional meta-data resulting in an enriched trigger, or markup trigger enabling real-time, targeted ad insertions from one or more video origins into a single video playout. Enhanced markup triggers communicate along with consumer behavior to an advertising services system for optimized network and asset delivery management. The invention is also capable of selecting ad videos to be played at an identified ad spot; and reporting complete and incomplete ad impressions and related user activities to the Ad Management System 12.

Figure 2:
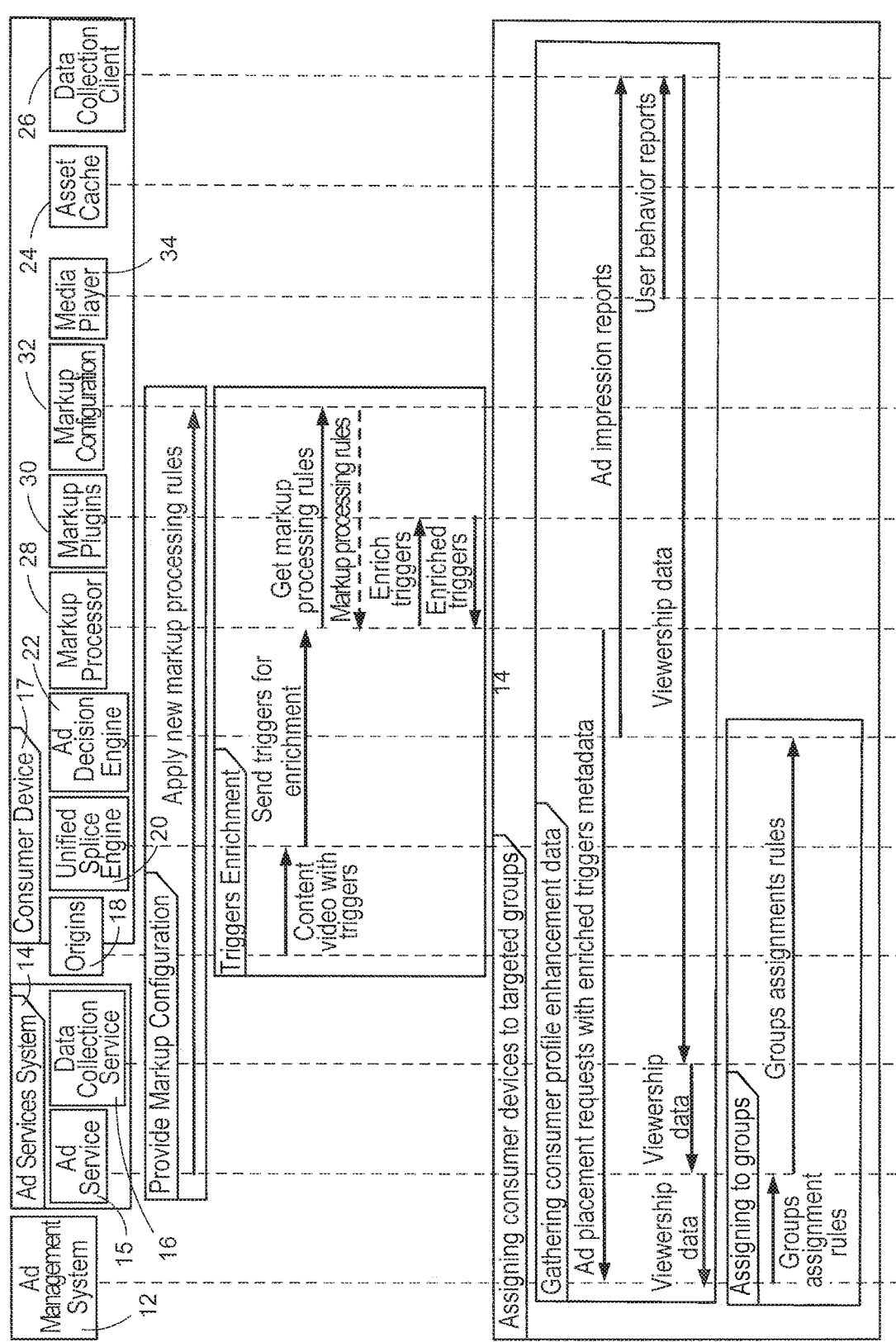
FIGS. 2, 2A and 2B represent a sequence diagram for operations constituting the method and system of the invention.
Figure 2A:
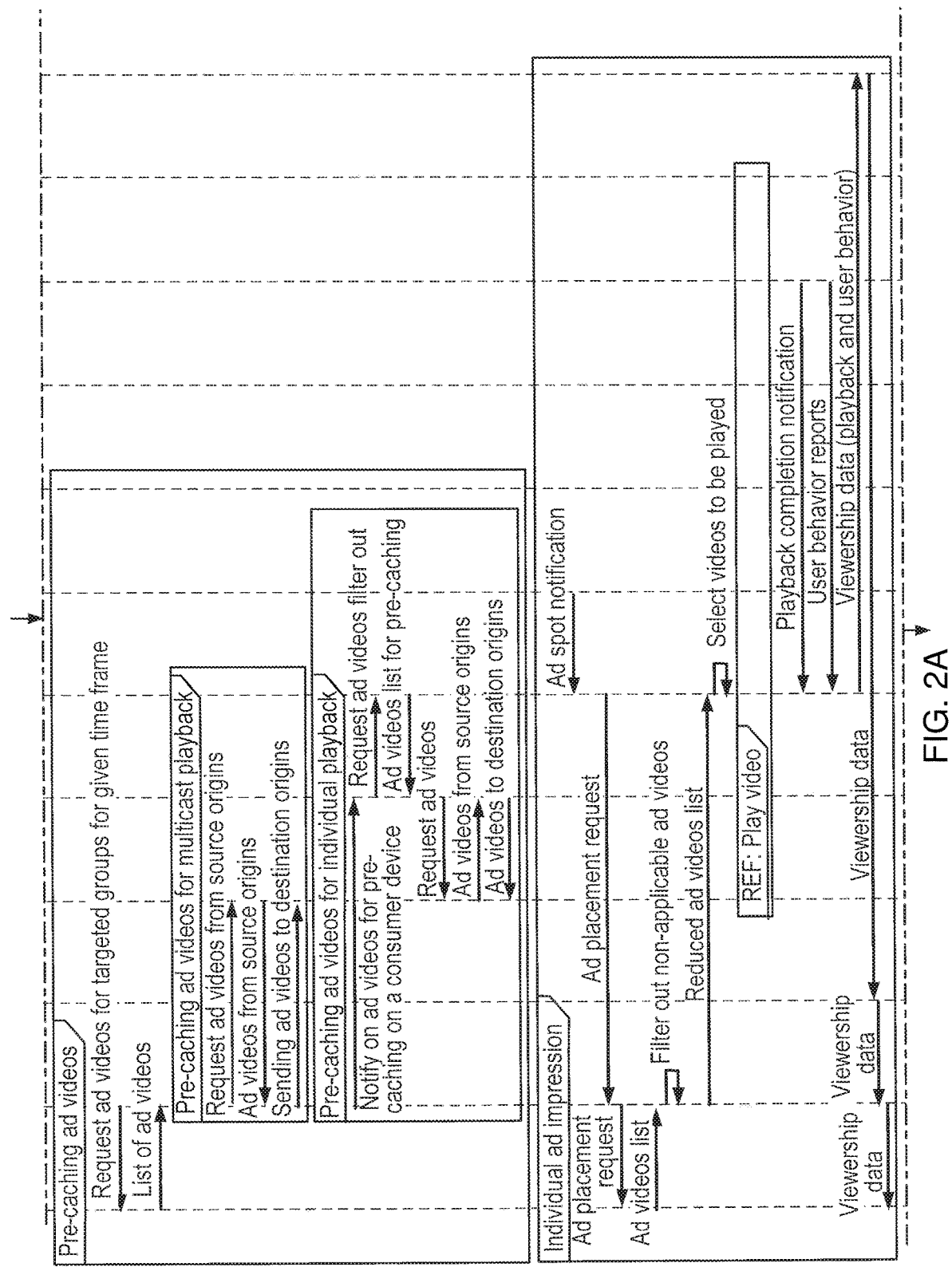
Figure 2B:
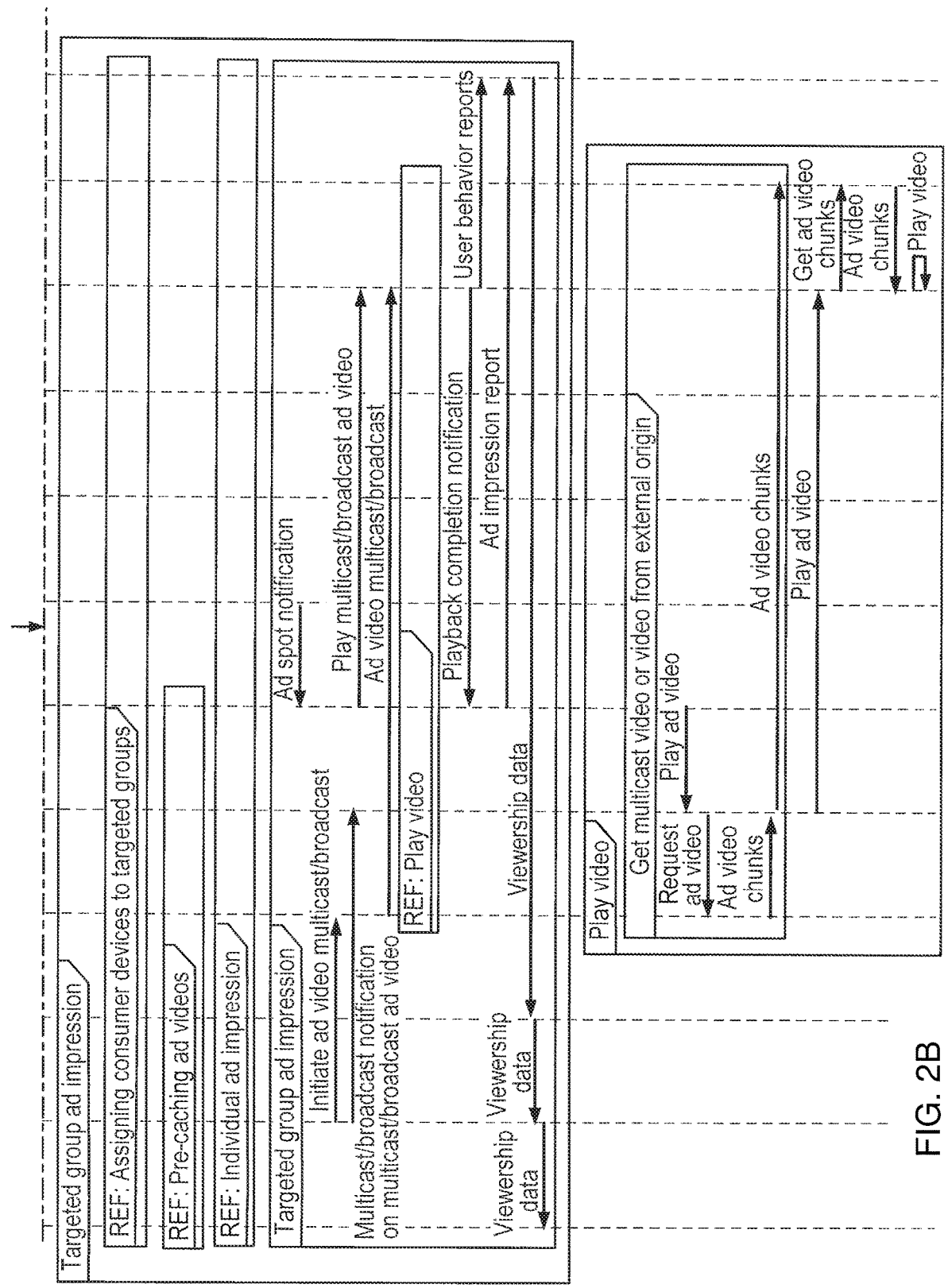

We are referring now to FIGS. 2, 2A and 2B which is a sequence diagram for operations constituting the method and system of the invention.

Operation: Provide Markup Configuration

One of the primary functions of Ad Service 15 is to provide STB with up to date ad markup configuration 32. Configuration is generated by Ad services 15 based on the ad target population segmentation rules. These rules may include segmentation based on the geographical location, service group, obfuscated information from the customer profile originating from the Operator back-end system, etc. In some embodiments of the invention Ad Service 15 is pushing profiles to the target STB population via broadcast or other message transports. In other embodiments STB devices send requests to the Ad Service 15. As to the rules for producing generated ad spots, these rules are as provided by the Ad Service 15. Markup rules may contain information for the STB to choose certain allowed Origin, rules for producing generated ad spot, rules to download and pre-cache forecasted ad inventory.

Operation: Triggers Enrichment

Typically Origins 18 transmit video containing ad triggers. Upon de-multiplexing the video ad triggers are filtered by Unified Splicing Engine 20 and sent to Markup Processor 28 for enrichment. Set of ad spots is enriched with the targeting information related to the programming metadata and customer profile. Other embodiments may use different enrichment information.

Markup Processor 28 retrieves markup processing rules previously provided by Ad Services 15 and performs trigger enhancement utilizing one of the available markup plugins 30. Trigger enrichment is performed to respond to the ad spot opportunity in accordance to the rules provided by the Ad Management System 12.

Operation: Individual Ad Impression

Individual ad impressions are specific to a given consumer device 17. Only those consumers watching a video sequence produced by the consumer device will be watching an ad. The Ad Decision Engine 22 requests applicable ad videos from the Ad Services System 12, which formats the request to the Ad Management System for processing. Responses from the Ad Management System are processed by the Ad Service System 14 which filters out non-applicable ad videos listed in the response, and produces meta-data describing the targeted video sequence for processing by the Unified Splicing Engine 20 and the Media Player 24.

Operation: Targeted Group Ad Impression

This section describes a method, enabled by the system of the invention 10, to display multiple ad videos on the large number of consumer devices with ad spots overlapping in time. The example of such overlapping ad spots would be a large number of consumers watching a popular TV show, such as a sport event or watching TV in prime time, when multiple TV networks allocate the same time intervals for advertisement. This typically results in hundreds of thousands or even millions and tens of millions of consumer devices 17 having an ad spots at the same time or during overlapping time frames.

Conventional broadcasted ad videos are inserted in the video stream on the TV network level or on the TV provider network or its segment. This limits capabilities of the exiting video delivery infrastructure, to execute multiple concurrent ad campaigns intended for targeted consumer groups receiving video signal from the same network equipment where ad video was inserted. The invention removes this limitation by allowing shared viewing of the different ad videos by targeted consumer groups.

The solution to the stated problem is to divide all available consumer devices 17 into target groups based on available viewership data, capabilities of the video origins, and available bandwidth for video delivery between origin and consumer device. This information is used to identify how many simultaneous ad video playbacks are possible.

The complete process of the targeted group ad impression is as follows. Consumer device 17 provides information about consumer behavior and consumer device hardware characteristics. This information is transmitted to an Ad Management System 12 by the Ad Services System 14.

An Ad Management System 12, best illustrated in the diagram of FIG. 1, identifies characteristics of each targeted consumer group and delivers this information to the Ad Services System 14. The Ad Services System 14 relays this information to the Markup Processor 28 where the markup will be processed by the Unified Splicing Engine 20.

The Unified Splicing Engine 20 commands the Ad Decision Engine 22 to use this information to assign a consumer device to the targeted consumer groups also enriching the trigger meta-data for later processing by the Unified Splicing Engine 20. The Ad Service 15 requests an Ad Management Service 12 for ad videos to be shown to all targeted consumer groups in near futures such as few hours or one day. The exact time frame is configurable on the Ad Service 15. An Ad Management System 12 provides the Ad Service 15 with list of ad videos and their current locations.

Depending on location of each ad video, the Ad Service 15 decides which ad videos must be pre-cached and on which origin. The Ad Service 15 then performs caching of the ad videos that needs to be pre-cached on origins not controlled by consumer devices. For example, a Local Storage (HDD, SSD, or similar) and CDN can be used by Ad Service 15 as the consumer device 17 controlled and Ad Services System controlled origins 18 respectively for caching ad videos.

The Ad Service 15 instructs Unified Splicing Engine 20 on consumer devices to pre-cached ad videos that can be cached on the origins controlled by consumer devices.

The Unified Splicing Engine 20 pre-caches ad videos according to instructions received from the Ad Service 15. The pre-caching by the Unified Splicing Engine 20 is performed based on a set of dynamic rules that take into account the Ad Services System 14 understanding of the network state, targeting priorities or on a best effort basis meaning the Unified Splicing Engine 20 first pre-caches the ad videos with higher priority. The ability of the Unified Splicing Engine 20 to pre-cache ad videos is determined and computed based on the time available for delivery of the ad video on the desired origin, available bandwidth on the route of the ad video from source to said origin, and storage size available to the consumer device for caching ad videos.

The ad videos pre-cached on origins controlled by consumer devices are played back by a consumer device according to function of the Markup Processor 28, Ad Decision Engine 22, and Media Player 34. Such playback is no different from individual ad impression disclosed in the previous section.

The ad videos pre-cached on the origins controlled by the Ad Services System 14 are played back by collaborative efforts of the Ad Service 15, the ad video origin, the Markup Processor 28, Ad Decision Engine 22, and the Media Player 34. Specifically, at the time of the associated ad spot, the following takes place. The Ad Service 15 initializes origins to start multicast playback of the ad videos to the targeted groups of the consumer devices. The Markup Processor 18 reports ad spot to the Ad Decision Engine 22. The Ad Decision Engine 22 instructs the Media Player 34 to start playback of the multicast ad video stream initiated by the Ad Service 15.

Operation: Gathering Consumer Profile Data (Including Enhancement and Billing Information)

Markup Processor 28 uses enhanced ad trigger metadata enriched with the STB ad target group data to generate personalized or segment ad placement request. Request is sent to Ad Management System 12 for the real time of ahead of time ad decision. In some embodiments of this invention the placement request may traverse Ad Service 15.

Ad is shown to the customer as part of the Ad Impression Flow (see below) and generated personalized Ad Impression Report is then sent to Multiservice Data Collection Agent 26.

Multiservice Data Collection Client 26 is also receiving the information regarding customer behavior, such as attempts to pause ad, fast forward ad or mute sound.

Collected Ad Impression Reports are then communicated to Data Collection Service 16. Some parts of the collected reports are also communicated to Ad Service 15 and may affect markup provisioning logic. Finally, Ad Impression Reports in a form of impression affidavit are delivered to Ad Management Systems 12 for the purposes of billing.

Operation: Assigning Consumer Devices to the Targeted Groups

Each consumer device 17 reports its characteristics and user behavior to the Ad Service 15 via Data Collection 26. This information is then reported by the Ad Service 15 to the Ad Management System 12.

The system components of the invention also provide an Ad Management System 12 with the following information. The Markup Processor 28 provides available ad spots and enhanced ad spot metadata provided by plugins 30. The Media Player 34 reports to the Unified Splicing Engine 20 the complete and incomplete ad impressions and user actions related to skipping or avoiding viewing ad video. The Unified Splicing Engine 20 uses Data Collection Client 26 to relay this data to an Ad Management System 12 through the Ad Services System 14. The Ad Management System 12 is then using this information along with other information that may be provided to it from other sources such as user profiles, billing system, viewing history and preferences, geographical location, etc. to identify most optimal targeted groups. The Ad Service 15 receives targeted group parameters and delivers it to the population of the consumer devices. Upon receiving the parameters of the targeted groups, the Ad Decision Engine 22 selects appropriate targeted groups corresponding to a respective consumer device. If specific targeted group cannot be identified, then a default group will be selected.

Operation: Pre-Caching Ad Videos for Targeted Groups

Ad Service 15 running as part of Ad Services System 14 periodically polls Ad Campaign System to obtain the list of the available ad inventory for the given market segment and time of the campaign.

The following functions can be also provided by Ad Service 15 upon receiving a response. Notification is sent to the STB with instruction to initiate Ad pre-caching. In case of the multicast playback Ad Service 15 will source Ad Videos from unicast Origins and may relocate them to multicast Origins for distribution. In case of unicast distribution (individual playback), Ad Service 15 will communicate with Unified Splicer 20, which in turn obtains the list of the Ads to be cached from the Ad Decision engine 22. Unified Spliced engine 20 then retrieves Ads from the source Origin and relocates them onto cache Origin 24 (such as memory buffer or internal flash memory on the STB).

The Ad Service 15 is storing the identifiers of the targeted groups and requests Ad Management System 12 to provide a list of ad videos applicable to each group for each origin and for the configured duration from the current moment in time.

The Ad Management System 12 provides the Ad Service 15 with the list of ad videos and Ad Service pre-caches eligible ad videos on the capable origins. Only ad videos residing on the origins capable of unicast video delivery are eligible for caching. Capable origins for caching include server-side origins (i.e. CDN) and local storage on a consumer device. In the later cases, the Ad Service 15 may instruct the Unified Splice Engine 20 on the target consumer devices to pre-cache the ad videos on the origins available local to the said devices.

Operation: Identifying Upcoming Ad Spots Depending on a Content Video Selected by a Consumer Depending on the origin, the Markup Processor 28 performs one of the following steps/functions of identifying the ad spots. For the live content videos, it relies on the ad triggers associated and delivered along with the videos. For the content videos recorded along with ad spot metadata, the metadata is used to identify the ad spots. For the content videos without ad spot metadata, the Markup Processor 28 generates ad spots based in available markup configuration, if the content video has not been marked as prohibited for generated ad spots.

Operation: Selecting Ad Videos to be Played at an Identified Ad Spot

The Ad Decision Engine 22 decides on which ad videos and in which order must be played in the available ad spot. This decision is backed by ad spot attributes provided by the Markup Processor 28 and rules provided by an Ad Management System 12. Depending on the origin of an ad video, the Unified Splice Engine 20 instructs the Media Player 34 to setup a streaming session, allocate a QAM tuner, allocate other resources needed for successful ad video playback, etc. If specific ad video cannot be played, then Unified Splicing Engine 20 communicates with Ad Decision Engine 22 to identify a replacement ad video to be played instead.

Operation: Playing Ad Video

Video chunks retrieved from external or multicast Origins by Unified Splice Engine 20 are placed into Asset Cache buffer also references as Video Cache 24 and Media player 34 retrieves chunks of video from the Asset Cache buffer and plays them out.

Operation: Reporting Complete and Incomplete Ad Impressions and Related User Activities to the Ad Management System Each complete and incomplete ad impression is reported by the Ad Decision Engine 22 to the Data Collection Client 26. The Data Collection Client 26 sends impression reports to the Data Collection Service 16. The Data Collection Service sends impression reports to an Ad Management System 12. The Ad Decision Engine 22 also reports related user activities in the same way. This includes the following: rewind ad spot, fast forward ad spot, stop ad spot playback, pause ad spot playback, un-pause ad spot playback, and switching to another content video during ad video playback. Other events can be supported by the reporting mechanism depending on the needs of an actual use.

What is claimed is:

1. A method for providing a unified video stream, including a video content item selected by a user and advertisement videos from multiple origins spliced into targeted ad spots in the video content item, to a consumer device, the consumer device, the multiple origins, and a server forming a network, the method comprising:
   at least one video cache, forming part of the consumer device, receiving a plurality of advertisement videos from the multiple origins via one or more corresponding origin plugins;
   at said at least one video cache associated with the consumer device, caching said received plurality of advertisement videos, such that the cached advertisement videos are accessible for seamless splicing and time-ordering thereof into the targeted ad spots;
   analyzing, at an ad service of an ad services system of the server, an available advertisement inventory;
   generating, at said ad services system, an up to date advertisement markup configuration, said up to date markup configuration being generated by said ad services system based on ad target population segmentation rules, prior to an expected available ad spot in the content video;
   providing said up to date markup configuration from said ad service to the consumer device;
   at the consumer device, using said markup configuration to provide a chain of markup rules comprising selection of advertisements from one or more allowed origins, producing the target ad spots, downloading and pre-caching analyzed available advertisement inventory;
   selecting, by an ad decision engine forming part of the consumer device, advertisement videos to be spliced into the targeted ad spots;
   at a splice engine forming part of the consumer device, filtering ad triggers received from the multiple origins, and providing the filtered ad triggers to a markup processor of the consumer device for enrichment with targeting information;
   at said markup processor, enriching said filtered ad triggers utilizing one of said markup plugins;
   processing video triggers and splicing said selected advertisement videos from said at least one cache into said targeted ad spots thereby to form a unified video stream, by said splice engine, said splicing including controlling video splice events to ensure temporal ordering of video content in the unified video stream;
   displaying said unified video stream by a media player functionally associated with said splice engine;
   collecting ad impressions data and user behavioral information by a client-side data collection service forming part of the consumer device; and
   providing said collected ad impression data and user behavioral information to a server-side data collection service forming part of the server,
   wherein said selecting of said advertisement videos at said ad decision engine is based on said markup configuration, instructions provided by said ad service, a state of available video origins and of said at least one video cache and based on a pre-defined ad targeting mechanism.

2. The method of claim 1, further comprising, prior to said splicing and at said ad service, controlling information received from the multiple origins and caching of videos in said at least one video cache based on knowledge of a configuration of the network, consumer behavior, a profile and hardware capabilities of the consumer device, and said pre-defined at targeting mechanism.

3. The method of claim 1, further comprising, when implementing said markup configuration, which is plugin based, abstracting access of said media player to the multiple origins and the at least one video cache.

4. The method of claim 1, where said selecting of said advertisement videos is also based on behavioral information of the user collected by said client-side data collection service and on knowledge of the network, to ensure that said selected advertisement videos align with an external ad campaign management system at the time of said splicing.

5. The method of claim 1, wherein said selecting of said advertisement videos comprises selecting the advertisement videos to minimize at least one of network traffic and a computational burden on the consumer device.

6. The method of claim 1, further comprising, when ad videos are targeted to an arbitrary consumer group which may include one or more consumers, controlling multi-cast playback of ad videos to said arbitrary group of consumers, such that said playback is aligned with a scheduled ad spot.

7. The method of claim 6, further comprising grouping said one or more consumers into said arbitrary consumer group based on at least one of consumer behavior and consumer device hardware characteristics.

8. The method of claim 1, further comprising demultiplexing or decoding video stream packets by a plurality of video decoders, wherein said demultiplexing or decoding comprises decoding a video output of said content video by one of said plurality of video decoders which comprises a primary decoder, wherein said demultiplexing or decoding further comprises demultiplexing and decoding packets of a second target stream to be spliced with said video output ahead of a time of a specific ad spot, such that splicing of said second target stream into said video output results in a visibly uninterrupted video stream, said demultiplexing and decoding packets of said second target stream being carried out multiple passive decoders of said plurality of video decoders, which are disconnected from said video output.

9. The method of claim 1, wherein said providing said up to date markup configuration from said ad service to the consumer device comprises pushing markup configurations to multiple target consumer devices via broadcast.

10. The method of claim 1, wherein said collecting said ad impressions data and said user behavioral information comprises collecting information relating to each complete and incomplete ad impression, as well as information relating to at least one of the following user behaviors: rewind ad spot, fast forward ad spot, stop ad spot playback, pause ad spot playback, un-pause ad spot playback, and switching to another content video during ad video playback.

\* \* \* \* \*